United States Patent [19]
Billeter

[11] 3,792,834
[45] Feb. 19, 1974

[54] PACKING SEALS
[75] Inventor: Henry R. Billeter, Deerfield, Ill.
[73] Assignee: Sloan Valve Company, Franklin Park, Ill.
[22] Filed: Jan. 22, 1973
[21] Appl. No.: 325,751

Related U.S. Application Data
[63] Continuation-in-part of Ser. No. 106,991, Jan. 18, 1971, abandoned.

[52] U.S. Cl............ 251/148, 285/334.1, 285/348, 277/110, 277/215
[51] Int. Cl............................................. F16l 29/00
[58] Field of Search .......... 251/142, 148, 105, 150; 285/348, 334.1; 277/110, 116.8, 208, 215, 206

[56] References Cited
UNITED STATES PATENTS

| | | | |
|---|---|---|---|
| 3,288,498 | 11/1966 | Billetel............................ | 285/348 X |
| 2,489,715 | 11/1949 | Mark, Jr. et al................ | 277/215 X |
| 3,328,040 | 6/1967 | Prichard ....................... | 277/116.8 X |
| 1,947,623 | 2/1934 | Shimer............................ | 277/206 X |

Primary Examiner—William R. Cline
Attorney, Agent, or Firm—Parker, Plyer & McEachran

[57] ABSTRACT

An annular flexible leak-proof packing seal for use in the connection between the air brake pipe on a railway car and the angle cock. The packing sleeve has two grooves around it which are compressed when the sleeve is in place, and on low temperatures the packing sleeve effects a configuration to provide the leak-proof seal regardless of its shrinkage.

4 Claims, 5 Drawing Figures

PATENTED FEB 19 1974
3,792,834
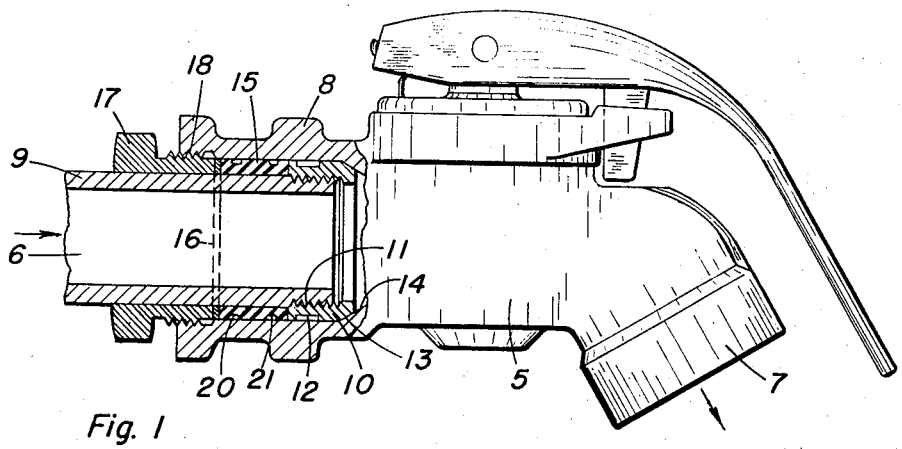
Fig. 1
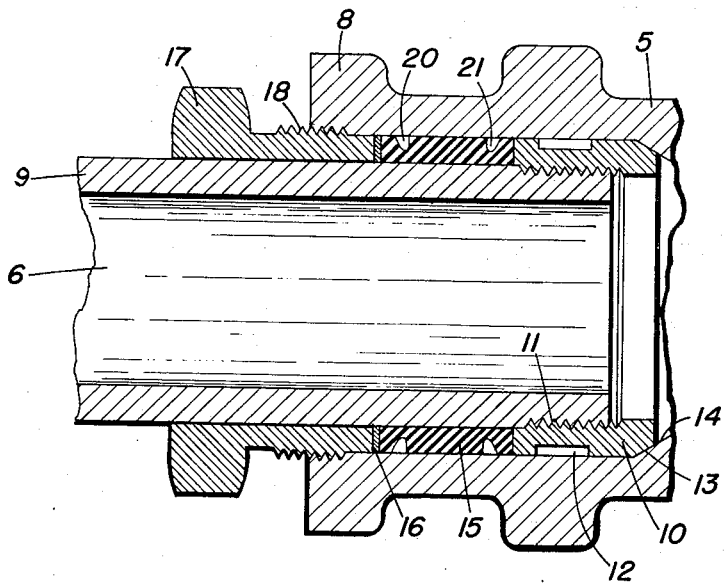
Fig. 2
Fig. 3
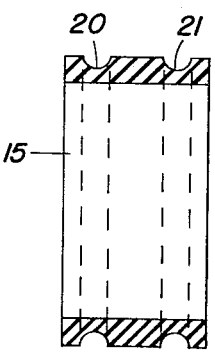
Fig. 4
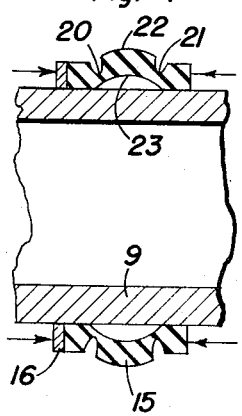
Fig. 5
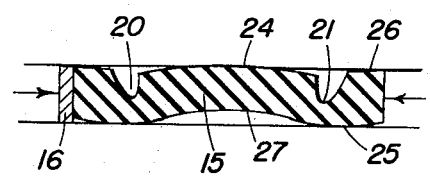
INVENTOR.
HENRY R. BILLETTER
BY
PARKER, CARTER & MARKEY
ATTORNEYS

PACKING SEALS

This application is a continuation in part of my copending application Ser. No. 106,991, filed Jan. 18, 1971, and now abandoned.

BACKGROUND OF THE INVENTION

It has been the practice in railway operations to provide a static sealing member or packing sleeve between the air brake pipe and its connection to the angle cock on each end of a railay car. These packing sleeves usually took the form of an annular sleeve around the brake pipe which is squeezed and held in place by a locknut. Under ordinary conditions of operation and in normal ambient temperatures these packing sleeves were reasonably effective to prevent leakage outward from the brake pipe and angle cock. However under conditions of extremely low temperatures the packing sleeve often leaked air due to the cold shrinkage of the flexible material from which the packing sleeve was made.

As is well known railway train operations often take place under extreme variations in temperature and consequently the operating equipment on the railway cars must be designed with these conditions in mind. When train operations take place in southern summer and humid climates there is usually no problems of leakage of air pressures from the air brake pipes and the several valve devices on the cars. This is because the packing sleeves, seals and other sealing devices, being under compression, are generally not affected by either normal or hot temperature environments, and therefore cause no leakage of air. However, when trains operate in northern climates and in winter the temperatures can reach as low as 60° below zero. Under such extreme cold conditions the packing sleeves and other sealing devices are caused to shrink and reduce in volume so that air leakage often occurs, although the seals are under compression at the time. This has been a common experience in railroad operation and one of the most perplexing because in the first place it is inconvenient for the railroad workers to go along a train of cars just to tighten the locknuts on each angle cock to stop the leaks, and furthermore to do so may damage the packing sleeve under those conditions.

It is an object of the invention to provide a new and improved packing sleeve for the aforesaid purpose which remains positively leak-proof at all degrees of temperature, which is readily applied to new or existing installations, which is economical to produce, and is long lasting for its intended purpose.

BRIEF DESCRIPTION OF THE DRAWINGS

FIG. 1 shows an angle cock partly in section to which the packing sleeve of the invention is applied;

FIG. 2 is an enlarged cross-sectional view of a portion of the air brake pipe and angle cock showing the packing sleeve in compression and under normal temperature conditions;

FIG. 3 is a full-sized view of the packing sleeve;

FIG. 4 is a partial view showing the packing sleeve under assumed compression conditions; while FIG. 5 is a partial view showing the packing sleeve in assumed compression and under conditions of low temperature.

DESCRIPTION OF THE PREFERRED EMBODIMENT

Referring to FIG. 1, this illustrates an angle cock of the type used for connecting up the air brake pipe extending through and between the railway cars. This angle cock may, for example, be such as that disclosed in U.S. Pat. No. 3,288,498 issued Nov. 29, 1966 to H. R. Billeter. It comprises generally a cast body portion 5 having an air inlet pipe 6 and a threaded outlet 7 with a ball-shaped valve member (not shown) inside the body for controlling the air flow through the valve. The outlet 7 connects with the usual flexible hose connection between two railway cars while the inlet 6 connects with the rigid air brake pipe 9 extending throughout the length of the railway car.

In assembling the connection between the brake pipe 9 and the angle cock 5, a pipe adapter 10 cylindrical shaped, and having internal pipe threads 11 is threaded on the inner end of the pipe 9 by means of the wrench flats 12 formed around the adapter 10. The adapter 10 is inserted into the inlet end 8 of the angle cock 5, and has a tapered end 13 which butts up against a beveled shoulder 14 formed in the valve body 5. A cylindrical shaped packing sleeve 15 of the invention, is slid over the brake pipe 9 and butted against the end of the pipe adapter 10 in the position shown. The static packing sleeve or sealing member 15 is made of flexible material such as synthetic rubber "Buna "n" characterized by its long life and imperviousness to oil and grease, as well as its resistance to abrasion and stability, under vibration and shock. Next a friction ring 16 is slid over the pipe 9 and against the other end of the packing sleeve 15. A locknut 17 is next passed along pipe 9 and threaded at 18 into the valve inlet portion 8 and against the friction ring 16.

This completes the assembly of parts and to make the connection leak-proof and solidly joined so it cannot be pulled apart, the locknut 17 is tightened up into the body 8 to squeeze the packing sleeve 15 between ring 16 and adapter 13 so that it expands tightly against the inner walls of the body portion 8 and around the outside of the brake pipe 9, producing a tight seal against leakage of air from the interior of the valve body 5 to the outside of the pipe connection. As a further result of the tightening of locknut 17, the tapered end 13 of pipe adapter 10 is forced tightly against the valve body shoulder 14 thereby solidly anchoring the inner end of the pipe 9 in the valve body and preventing withdrawal of the pipe.

The foregoing general construction and assembly of parts presents a number of advantages desirable in practice when installed under service conditions on railway cars, as pointed out in U.S. Pat. No. 3,288,498 previously mentioned. The essence of the present invention, however, resides in the construction and arrangement of the packing sleeve 15 and its assembly in the railroad angle cock.

Referring now particularly to FIG. 3, this is a full size cross-section through the cylindrical packing sleeve 15 in its original shape before insertion in the angle cock. Its normal slightly expanded volume is as shown with the length equal to about one-half of the outer radial diameter of the sleeve. It is provided with two circular grooves 20 and 21 extending around the outer circumference of the sleeve. These grooves 20 and 21 are semi-circular in cross-sectional shape with the depth of the grooves extending approximately half way through the thickness of the sleeve from the outside. The width of the grooves across the edges is approximately equal to the thickness of the sleeve. The grooves are located adjacent each end of the sleeve, at a distance approximately equal to the width of the grooves.

When a compressive force is applied to the ends of the sleeve as indicated by the arrows in FIG. 4, and with the sleeve slid over a pipe 9, and no confinement on its outer diameter, the sleeve will tend to bulge outward as indicated at 22. The internal diameter of the sleeve at its mid-section bulges outward as indicated at 23, while the side walls of the grooves 20 and 21 tend to approach each other at their outer ends. This illustrates the strains and expansion forces which are produced in the sleeve when squeezed endwise and when inserted and installed in the angle cock as shown in FIG. 2. With the sleeve distorted to the compressed chamber as illustrated in FIG. 2 a tight seal is provided around all portions of the sleeve. The outer ends of the grooves 20 and 21 are forced toward each other as the sleeve is distorted and tends to fill up the grooves, so that the semicircular shape of the grooves as seen in FIG. 3 assumes the shape as shown in FIG. 2. The grooves tend to return to their original shape when the rubber contracts with the cold, as will be pointed out hereinafter. No leakage of air outward either between the pipe 9 and locknut 17, or between the valve body 8 and adapter 10 and locknut 17 is possible due to the excellent sealing properties of the sleeve under the aforesaid conditions.

The construction of the sealing and packing sleeve 15 is also such that the leak-proof seal remains intact when tested at 120 PSI and with the temperature range from ambient down to minus 65° Fahrenheit (−65°). This low temperature is ofen encountered by railway cars operating during the winter in northern climates, as pointed out. Due to the fact that rubber or other flexible materials undergo a certain amount of shrinkage during such extreme cold conditions, it is believed that the shrinkage stresses in the packing sleeve cause it to assume the shape generally as depicted in the large scale drawing, FIG. 5. Under these cold conditions the compression forces indicated by the end arrows cause the shrunken sleeve to be distorted so that the seal is maintained at points 24, and at 25 and 26 at each end of the sleeve. There will be less sealing action maintained at the point 27 however. The grooves 20 and 21 under these conditions may or may not tend to be slightly expanded or moved apart at their open edges or sides due to this shrinkage condition. This buckling action of the sleeve caused by the shrinking action is effective to prevent leakage of air from the air brake pipe as has been conclusively proven under numerous tests and under actual operating conditions.

Although the invention of the packing sleeve has been illustrated and described in connection with a railroad angle cock, it will be apparent that it would serve equally as well to maintain a perfect sealing action for many different types of valves or pipe connections requiring a perfect seal under all adverse conditions.

What is claimed is:

1. A railroad angle cock including a housing having a generally cylindrical inlet chamber and an outlet, a valve member positioned within said housing for controlling communication between said inlet chamber and said outlet, a generally cylindrical seal member confined in said chamber and subjected to compression in an axial direction, said seal member having a pair of spaced peripherally extending annular grooves about the exterior thereof, each of said grooves being generally semi-circular in shape and having a depth generally equal to one-half the thickness of the seal member, said grooves being spaced inwardly from the ends of the seal member a distance generally equal to the width of the grooves, said grooves having an outer width generally equal to the thickness of the seal member, the length of the seal member being generally equal to one-half of its diameter, axial compression applied to said seal member causing the groove sides to move toward a closure and causing the central area of said seal, between the grooves, to be distorted outwardly and the ends of the seal, adjacent the grooves, to be distorted inwardly to provide firm seals with the inner and outer axially extending walls of the chamber, said seal being formed of a material such that low temperature shrinkage causes said grooves to tend to open and said seal to bow outwardly adjacent the center to provide a firm seal at the central area of the chamber outer wall and firm seals at the ends of the seal, adjacent the grooves, with the chamber inner wall.

2. The structure of claim 1 further characterized by and including a pipe within said chamber forming the inner wall thereof.

3. The structure of claim 2 further characterized by and including a compression nut positioned about said pipe outside of said housing and having a portion extending within said housing for applying endwise compression on said seal member.

4. The structure of claim 3 further characterized by a friction ring positioned between said nut and seal.

* * * * *